(12) United States Patent
Boerstoel et al.

(10) Patent No.: US 7,758,960 B2
(45) Date of Patent: *Jul. 20, 2010

(54) COMPOSITE MATERIALS COMPRISING PPTA AND NANOTUBES

(75) Inventors: Hanneke Boerstoel, Arnhem (NL); Hendrik Swierenga, Oosterhout (NL); Aart Klinkhamer, Elst (NL)

(73) Assignee: Teijin Aramid B.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/382,988

(22) Filed: Mar. 27, 2009

(65) Prior Publication Data

US 2009/0252960 A1    Oct. 8, 2009

Related U.S. Application Data

(63) Continuation of application No. 10/588,160, filed as application No. PCT/EP2005/002931 on Mar. 18, 2005, now Pat. No. 7,534,486.

(30) Foreign Application Priority Data

Mar. 20, 2004  (EP) .................................. 04006765

(51) Int. Cl.
*D02G 3/00* (2006.01)
(52) U.S. Cl. ...................................... 428/364; 428/372
(58) Field of Classification Search ................. 428/372, 428/364, 408, 394
See application file for complete search history.

(56) References Cited

U.S. PATENT DOCUMENTS

| 5,512,368 | A  | 4/1996  | Harmer et al. |
| 6,068,919 | A  | 5/2000  | Ypma et al. |
| 6,114,037 | A  | 9/2000  | Vos et al. |
| 6,706,793 | B2 | 3/2004  | Abu-Isa et al. |
| 6,905,667 | B1 | 6/2005  | Chen et al. |
| 7,285,591 | B2 | 10/2007 | Winey et al. |
| 7,309,727 | B2 | 12/2007 | Elkovitch et al. |
| 7,361,430 | B1 | 4/2008  | Gennett et al. |
| 7,365,100 | B2 | 4/2008  | Kuper et al. |
| 2004/0022981 | A1 | 2/2004 | Hu et al. |
| 2005/0089677 | A1 | 4/2005 | Marissen et al. |
| 2007/0160821 | A1 | 7/2007 | Boerstoel et al. |

FOREIGN PATENT DOCUMENTS

| EP | 0 449 197 A2    | 10/1991 |
| EP | 1 336 673 A1    | 8/2003  |
| WO | WO 03/080513 A2 | 10/2003 |
| WO | WO 03/085049 A1 | 10/2003 |

OTHER PUBLICATIONS

U.S. Textile Dictionary definitions of fiber(s) and multifilament, 2001.

*Primary Examiner*—N. Edwards
(74) *Attorney, Agent, or Firm*—Oliff & Berridge, PLC

(57) ABSTRACT

Disclosed is a composite material comprising PPTA (poly-p-phenyleneterephthalamide) and nanotubes having an aspect ratio of at least 100 and a cross-sectional diameter of 5 nm or less, the composite material containing up to 12 wt. % of nanotubes, obtainable by adding the nanotubes to sulfuric acid, decreasing the temperature to solidify the mixture, adding PPTA to the solid mixture, heating to above the solidifying point and mixing the mixture, and spinning, casting, or molding the mixture to the composite material.

1 Claim, No Drawings

US 7,758,960 B2

COMPOSITE MATERIALS COMPRISING PPTA AND NANOTUBES

This is a Continuation of application Ser. No. 10/588,160 filed Aug. 1, 2006, now U.S. Pat. No. 7,534,486, which is a National Phase of Application No. PCT/EP2005/002931 filed Mar. 18, 2005, which claims priority to EPO 04006765.4 filed Mar. 20, 2004. The disclosures of the prior applications are hereby incorporated by reference herein in their entireties.

The invention pertains to composite materials comprising PPTA (poly-p-phenyleneterephthalamide) and nanotubes, to a spin dope solution comprising the same, and to a process of making said solution, and to multifilament fibers made thereof.

Composites of single-wall carbon nanotubes (SWNT) and aromatic polyamides are known from WO 03/085049. According to this reference aromatic polyamide is added to SWNT to form the composite. It was also disclosed that aromatic polyamide can be mixed with SWNT in an acid to form a dope, which dope can be spun into a fiber or film. The homogeneous dope mixture was obtained by mixing SWNT and PPTA in sulfuric acid at 80-85° C. for several hours. The preferred aromatic polymer is PPTA. The method used in this reference has various disadvantages. For instance, if fibers are made only monofilament fibers are obtained. Further, tensile strength and modulus are relatively low. Tensile strength of 0.33 to 0.35 GPa and modulus of 13 to 19 GPa were obtained with the as-spun fiber. A further disadvantage of this method is the need of large quantities of SWNT in the mixture. According to this reference about 5 to 10 wt. % of SWNT, based on the total weight of SWNT and PPTA, is necessary to obtain composite materials with the above tensile strength and modulus. Because SNWT are extremely expensive compounds, this is a serious burden to commercialization of such products.

In EP 1336673 a method is disclosed for producing composite materials comprising carbon nanotubes. The composite materials are polyethylene-base materials, but generically it has been disclosed that other polymers such as PPTA can also be used. It was now found that the process as disclosed in this reference does not lead to composite products according to the present invention, i.e. products that can be spun, when PPTA rather than polyethylene is used. This is further demonstrated in Comparison examples 4 and 5.

In WO 03/080513 a composition is disclosed comprising a highly dispersed mixture of a polymeric material and nanostructures in a liquid medium. The polymeric material is selected from a large group of polymers, including aromatic polyamides. The specific examples of this reference describe composite materials made from epoxy resin exclusively. It was now found, as demonstrated in Comparison examples 4 and 5 that a process as disclosed in this reference does not lead to composite products according to the present invention, i.e. products that can be spun, when a highly dispersed mixture of PPTA and nanostructures (SWNT) in a liquid medium (sulfuric acid) is used.

There is a need for composite materials of nanotubes and aromatic polyamides with higher tensile strength and higher modulus, obtained from a spin dope that is also suitable for making multifilament fibers and yarns, and which may contain small quantities of nanotubes without detrimental loss of tensile strength and modulus. The composite materials should further have excellent compression strength, and preferably have flame-retardant properties.

It is an object of the invention to obtain a substantial improvement of the known method for making composite materials comprising nanotubes and aromatic polyamides. To this end the invention relates to a composite material comprising PPTA (poly-p-phenyleneterephthalamide) and nanotubes having an aspect ratio of at least 100 and a cross-sectional diameter of 5 nm or less, the composite material containing up to 12 wt. % of nanotubes (based on the total weight of nanotubes and PPTA), obtainable by adding the nanotubes to sulfuric acid, decreasing the temperature to solidify the mixture, adding PPTA to the solid mixture, heating to above the solidifying point and mixing the mixture, and spinning, casting, or molding the mixture to the composite material.

More particularly, the invention pertains to a method for making a spin dope solution comprising the steps:

a) adding the nanotubes having an aspect ratio of at least 100 and a cross-sectional diameter of 5 nm or less to sulfuric acid at a temperature above the solidifying point of the sulfuric acid;

b) decreasing the temperature to below the solidifying point of the sulfuric acid and mixing for a sufficient time to solidify the mixture;

c) adding PPTA to the solid mixture; and d) heating to above the solidifying point and mixing the mixture.

By the solidifying point of concentrated sulfuric acid is to be understood within the scope of the invention the temperature at which for the first time a solid phase begins to form in the liquid sulfuric acid which is cooled with stirring. Values for the solidifying point of concentrated sulfuric acid can be found in the literature. The term "concentrated sulfuric acid" means sulfuric acid having a strength of at least 96% by weight. Use may be made of concentrated sulfuric acid containing up to 20% by weight of free $SO_3$. The sulfuric acid to be used in step b) of the process according to the invention may have any temperature below its solidifying point. Considering that there are economical and technical disadvantages to the use of extremely low temperatures, however, the temperature to be chosen will generally not be more than 50° C. below the solidifying point of the sulfuric acid to be used. The temperature of the sulfuric acid, cooled down to below its solidifying point, is preferably lower than 0° C. Moreover, to prevent premature melting of the solid sulfuric acid it is preferred that use should be made of sulfuric acid cooled down to at least 5° C. below its solidifying point. The temperature of the PPTA to be combined with the sulfuric acid may be equal to, or higher or lower than room temperature, but need be so chosen that during the adding and the mixing processes the mixture remains in the solid state. Extremely high temperatures of the PPTA to be combined with the sulfuric acid will therefore be avoided. To prevent any heat introduced into the system by the PPTA or evolved in the mixing process from prematurely causing the mixture to melt it may be necessary to apply cooling during the process of bringing together the mixture of sulfuric acid and nanotubes and the aromatic polyamide and the mixing thereof. The temperature should preferably remain below the solidifying point of the sulfuric acid until the mixture has reached the homogeneity required for it to be used as spinning mass. If desired, the PPTA before it is combined with the sulfuric acid, may be cooled to below room temperature, for instance to below the solidifying temperature of the sulfuric acid. The preparation of the sulfuric acid cooled to below its solidifying point may be effected in various ways. The procedure is preferably such that the sulfuric acid is brought into a finely divided state before it is combined with the aromatic polyamide, which is also in a finely divided state, and mixed. By a finely divided state is to be understood within the scope of the invention a mass made up of particles which individually measure less than about 2 mm and preferably less than about 0.5 mm. Such particles may be bonded together to form conglomerates which during mixing are again split up into separate particles. Particularly, the finely divided sulfuric acid may be present in a state which strongly resembles that of snow. The sulfuric acid should always be so finely divided that upon mixing it with PPTA it forms a mixture suitable to be used as spinning mass.

To obtain the advantages of the process according to the invention it is necessary but not sufficient that concentrated sulfuric acid/nanotube/PPTA mixture should be intermixed at a temperature below the solidifying point of the sulfuric acid. Essential to the invention when making a spinning mass is that the concentrated sulfuric acid is cooled down to below its solidifying point before it comes into contact with the aromatic polyamide. Bringing together liquid sulfuric acid having a temperature above its solidifying point and finely divided PPTA followed by stirring at low shear rate conditions at a temperature below the solidifying point of the sulfuric acid will generally result in obtaining a non-homogeneous mixture which is not or hardly suitable for spinning purposes.

Surprisingly, the solidification step substantially improves the tensile strength and modulus of composites made of the above spin dope and make it possible to use minor amounts of nanotubes. Composite materials than can be made are, inter alia, fibers and films. The invention therefore also has the object of obtaining a fiber, particularly a multifilament fiber obtainable from the hereinabove mentioned spin dope solution. More particularly, the multifilament fiber preferably contains at least 5 filaments, more preferably at least 20 filaments.

A similar method of applying a solidification step in making mixtures of sulfuric acid, PPTA, and inorganic whiskers is known from U.S. Pat. No. 5,512,368. Thus according to Example 1 of that reference silicon carbide whiskers were added to and mixed with concentrated sulfuric acid, after which the mixture was frozen and PPTA was added. This mixture can be used as a spin dope for making monofilament microcomposite fiber. The whiskers used in this method, however, are not comparable with the nanotubes of the present invention. Thus the whiskers according to this reference are inorganic materials, particularly silicon carbide or silica, having a preferred aspect ratio of 5 to 50 and a cross-sectional dimension of about 0.1 to 1.5 µm at an average length of about 2 to 20 µm. These whiskers thus have dimensions that are a magnitude greater than the instantly claimed carbon nanotubes, and due to their giant dimensions are generally contained in high quantities in the fiber material, such as 25 wt. % according to Example 1.

According to the invention nanotubes are molecules made purely of carbon. Examples of such molecules are the buckyball or Buckminsterfullerene (C60=sixty carbon atoms in a spherical shape). Such molecules can, however, be modified such as by Diels-Alder reaction with unsaturated molecules having functional groups such as hydroxy, amino, and carboxyl groups. Such modified nanotubes are also encompassed within the protection sought. The term "nanotubes" particularly refers to tubular molecules such as tubular fullerenes, which is a tube that may be capped at each end by two hemispheres of C60 with only hexagonal and/or pentagonal units in its side walls. Further multi-walled carbon nanotubes (MWNTs: concentric cylinders of carbon) such as formed in a carbon arc discharge process are within the present definition of nanotubes. Preferably, however, the nanotubes are single-walled carbon nanotubes (SWNTs). Single-walled carbon nanotubes are tubes in which a single layer of graphite (graphene) is rolled up into a tube. Graphene consists of carbon atoms in a hexagonal structure like chicken wire. The rolling up can be accomplished in various ways. For example, carbon-carbon bonds can be parallel or perpendicular to the tube axis. Alternatively, the carbon-carbon bonds can be directed between parallel and perpendicular to the axis. The differently wrapped tubes are distinguished from one another by a double index (n,m), where n and m are integers. This double index specifies the number of unit vectors ($a_1$, and $a_2$) required to connect two atoms in the planar hexagonal lattice to form a tube.

The main impurities in SWNT material resulting from the different production processes are multi shell carbon nanocapsules ("bucky onions" that are produced to deactivate large catalyst particles), which are empty or filled with transition metal, amorphous carbon nanoparticles, MWNTs, uncapped catalyst particles, substrate particles (e.g. $SiO_2$), graphite and fullerenes. These impurities can be removed before SWNTs can be utilized in a composite material. Highly pure SWNT material, which comprises at least about 85% SWNTs, is preferred over lower purity material. For example in WO 98/39250 the SWNTs are heated under oxidizing conditions to remove amorphous carbon and other contaminating materials. The SWNTs are refluxed (at 120° C.) in an aqueous solution of an oxidizing agent (e.g. $HNO_3$, a mixture of $H_2O_2$ and $H_2SO_4$, or $KMnO_4$) at a concentration which is sufficiently high to etch amorphous carbon but not too high to prevent that the SWNTs will be etched. Useful concentrations are preferably in the range 2.0-2.6 M nitric acid.

The nanotubes according to this invention have an aspect ratio of at least 100 and a cross-sectional diameter of 5 nm or less. Preferably, the nanotubes have aspect ratios greater than 150, more preferably greater than 200, and a cross-sectional diameter of less than about 2 nm.

SWNTs are important nanotubes according to the invention because they can reinforce PPTA fibers, for instance by incorporation at void regions or by bridging between two crystalline domains. In void regions the SWNT should interact with the polymer chains in the crystal. This can be accomplished by Van der Waals interactions. However, it may also possible to modify the surface of SWNTs in such a way that the hydrogen bonds are formed between a group on the SWNT surface and the amide groups that do not participate in the hydrogen bonds in the crystal (approximately one third of the amide bonds in aromatic polyamides, such as Twaron®). In order to act as a bridge between the crystalline regions in a fibril, the SWNT should propagate through various crystalline regions. Consequently, it is preferred that the SWNT has a length of at least 100 nm (bridging three crystalline regions).

It is preferred that the nanotubes possess no curvature in the direction of the fiber axis. Curvature can dramatically reduce the mechanical properties of the nanotube/polymer composite. Although it is expected that nanotubes are aligned in the fiber direction through the liquid crystalline phase and drawing, special attention should be paid to the curvature. The best results are expected when the nanotubes are perfectly aligned along the fiber axis.

The term PPTA as used in the present invention stands for poly-p-phenyleneterephthalamide, which polymer is made by polymerizing para-phenylenediamine (PPD) as aromatic diamine monomer and terephthaloyl dichloride (TDC) as para-oriented aromatic dicarboxylic acid halide monomer. The definition of PPTA throughout this invention also includes such polymers wherein small quantities (less than 10 mole %, preferably less than 5 mole %, most preferably less than 2 mole %) of PPD and/or TDC are replaced by other aromatic diamine or dicarboxylic acid halide monomers, such as 2,6-naphthalenedicarboxylic acid dichloride, 2-chloroterephthaloyl dichloride, isophthaloyl dichloride, and 2,5-diamino-benzenesulfonic acid.

Preferably, the mixture is mixed in step a) for 10 min to 6 h at 10 to 90° C., more preferably 30 min to 4 h at room temperature to 70° C., most preferably at 45-55° C. The nanotube before addition is preferably first dried, preferably at elevated temperature (for instance about 80° C.) at vacuo for 2 to 24 h. Most preferably, the nanotubes are well dispersed in sulfuric acid (homogeneously distributed individual nanotubes) before ice making. It is preferred to disperse the nanotubes by a sonification process to improve and to speed up the formation of the dispersion. Sonification can be performed with the usual sonification apparatuses, generally by sonification for 10 minutes to 24 hours at 10 to 90° C., for instance for 3 hours at room temperature. Once the solution is transformed into ice, by decreasing the temperature to below the solidifying point of the sulfuric acid, generally to 7 to −20° C., preferably to 2 to −12° C., it can be mixed with PPTA to form a solid spinning solution. Prior to adding PPTA to the mixture the temperature is preferably maintained at −5 to 0° C.

The well dispersed nanotubes in sulfuric acid can penetrate into the porous PPTA structure. Mixing is very critical in order to obtain a good dispersion of the nanotubes in the PPTA spinning solution. The mixture is mixed for at least 1 h before increasing the temperature and then the temperature is preferably elevated to ambient temperature under mixing.

According to the process of the invention use is made of a mass which is prepared by intermixing PPTA and concentrated sulfuric acid/nanotube mixture in the solid state. Preferably, not until the sulfuric acid and the aromatic polyamide have completely been intermixed to a homogeneous mixture is the temperature of the mixture allowed gradually to rise to above the solidifying point of the sulfuric acid used. Although melting of the solid sulfuric acid particles might then be expected to give rise to the formation of a liquid sulfuric acid phase, such a phase is not noticeable in actual practice. In spite of the present mixtures of concentrated sulfuric acid/nanotubes and PPTA generally consisting of 75 to 85% by weight of concentrated sulfuric acid, they have, even at temperatures above the solidifying point of the sulfuric acid used, for instance above room temperature, a dry and sandy character. Apparently the sulfuric acid present is entirely absorbed by the polymer particles. For such a mixture to be spun it must, of course, be heated to a higher temperature. Depending on the composition of the polymer, the concentration and the inherent viscosity of the polymer, the temperature would have to be in the range of 20° C. to 120° C.

Bringing the sulfuric acid/nanotubes and the aromatic polyamide together in step c) may be effected in various ways. The sulfuric acid/nanotubes may be added to the aromatic polyamide or inversely. It is also possible for the substances simultaneously to be brought into a suitable space. The continuous preparation of the spinning mass may be carried out for instance with the aid of a mixer consisting of a housing provided with cooling elements and a rotary screw. Liquid sulfuric acid or a mixture of liquid sulfuric acid and nanotubes is fed into the inlet side of the housing, in which it is cooled. Into a following section, there where the temperature of the sulfuric acid has sufficiently decreased, the finely divided aromatic polyamide is added. The rotary screw will then also serve as mixing device. Then the solid mixture has reached the discharge side of the housing, it is sufficiently homogeneous to be used as spinning mass. Particularly suitable is the method by which into a vessel provided with a cooling device and a stirrer a liquid, concentrated sulfuric acid is introduced and subsequently converted, with stirring and cooling, into a snow like mass and subsequently, with continued stirring, the finely divided aromatic polyamide mixture is added.

The temperature of the PPTA/nanotubes/sulfuric acid mixture is elevated to above the solidifying point in step d) by applying conventional heating means.

The composite material obtained has a tensile strength of at least 1.5 GPa, preferably at least 2 GPa, and a modulus of at least 50 GPa, preferably at least 70 GPa, and can be made of compositions containing 12% by weight or less, preferably about 5% by weight, most preferably about 1% by weight based on the total of nanotubes and PPTA.

The compositions of the invention, particularly the films and fibers made of the spinning solutions are suitable for applications where high tenacity, high modulus, and high compression strength are of importance, such in composites for automotives, bullet resistant materials, including soft and hard ballistics.

The following is an experimental example of the invention, which is illustrative of the inventions and should not be interpreted as limitative.

EXAMPLE 1

A spinning solution (dope) was produced in a Drais mixer (type FH6) of 6 liter. During all spinning solution preparation steps, nitrogen was purged into the Drais mixer. The mixing chamber of the Drais mixer is a double-walled chamber. The following procedure was used to prepare the spinning solution.

Adding 2001 grams of sulfuric acid (99.8% by weight) to a preheated mixing chamber (wall temperature=50° C.) while purging the system with nitrogen.

Heating the mixture to a temperature of 50° C.

Adding 4.94 grams of single walled carbon nanotubes (SWeNT™ dry 85% purified SWNTs (lyophilized) grade S-P95-dry; SouthWest Nanotechnologies, Norman, USA) to the sulfuric acid. The SWNTs were dried at 80° C. under vacuum for 8-10 hours.

Mixing the solution (liquid sulfuric acid and the SWNTs) (mixing speed=20 rpm) for 120 minutes at a temperature of 50° C.

Transferring the mixture to a plastic storage bottle and sonicating (Bandelin, Sonorex super RK 1028H, 35 kHz) mixture for 3 hours (no heating was applied).

Transferring the mixture to the Drais mixer and decreasing the temperature to −10° C. (temperature of mixing chamber wall resulting in a mixture temperature of approximately −2° C.) and waiting for 2 hours. The sulfuric acid became solid.

Increasing the temperature to −2° C. (temperature of mixing chamber wall), adding 489 g of PPTA (having a relative viscosity 5.1) to solid mixture after 45 minutes and mixing for 1 hour at a wall temperature of −2° C.

Cooling was stopped, and mixing was performed for 11 hours. The temperature of the mixture slowly increased to ambient temperature.

EXAMPLE 2

Functionalization of Purified SWNT

The SWNTs were purified according to the following procedure:

3.11 g of SWNT (ex Nanoledge) were moistened in a blender (Waring commercial blender) in 300 ml of deionized water. To obtain sufficient moistening the suspension was evacuated three times in vacuo in an oven (room temperature, pressure smaller than 50 mbar) for 15 minutes. The SWNTs were settled after 12 h. The supernatant was sucked off and the paste was transferred to centrifuge tubes and centrifuged for 30 min at 4000 rpm (Heraeus, Megafuge 1.0). The resulting paste, 178.6 g of deionized water, and 58.17 g of $HNO_3$ (65%) were brought into a high pressure-resistant beaker, and heated in a microwave oven (Milestone Microsynth) to 180° C. (10 bar). The temperature of 180° C. was reached within 5 min (1000 W) and this temperature was kept for 1 h (80 W). The cooled mixture was centrifuged several times (4000 rpm; 30 min) using deionized water until the supernatant had reached pH~7.

The paste was suspended in about 300 g of NMP (N-methylpyrrolidone), stirred and centrifuged for 30 min at 2000 rpm. The supernatant was sucked off and this procedure was repeated four times. The paste was centrifuged for another three times with 300 g of IPA (isopropyl alcohol). The paste was dried for 24 h in a vacuum oven at 160° C. ($10^{-1}$ mbar).

The reaction between 4-amino-phenyl citraconimide (APCI) or 4-amino-phenyl maleimide (APMI) and purified SWNT was performed as follows:

A reaction tube containing 0.10 g of above purified SWNT and 0.20 g of APMI, and a tube containing 0.11 g of above purified SWNT and 0.21 g of APCI in 100 g of NMP were evacuated in a vacuum oven at room temperature, followed by an ultrasonic treatment (Bandelin, Sonorex Digital 10P) of 30 min at room temperature, and evacuated again. The reaction tubes, provided with a magnetic stirrer, were heated at 140° C. for 24 h under nitrogen and water cooling. The majority of the solvent was removed by a rotary evaporator (120° C., 15 mbar). The remainder was suspended in about 400 g of IPA and centrifuged for 30 min at 4000 rpm (Heraeus, Megafuge 1.0). This procedure was repeated four times. The modified SWNTs were dried in a vacuum oven for 48 h at 160° C. ($10^{-1}$ mbar). The modified SWNTs were analyzed using XPS, giving the atomic composition of the modified SWNTs. The following atomic weight percents (n %) were found.

| Sample | carbon content (n %) | oxygen content (n %) | nitrogen content (n %) |
|---|---|---|---|
| Purified SWNTs | 94.1 | 4.7 | 0.6 |
| SWNT modified with APMI | 87.4 | 9.0 | 3.2 |
| SWNT modified with APCI | 91.2 | 6.1 | 2.0 |

Using these values in combination with the molecular structure of APCI and APMI, the degree of functionalization based on nitrogen can be calculated. The following functionalization values were found.

| Sample | functionalization value based on nitrogen (mmole/g) |
|---|---|
| SWNT modified with APMI | 1.10 |
| SWNT modified with APCI | 0.61 |

EXAMPLE 3

The spinning solution of example 1 was spun on a RandCastle spinning machine (a small scale spinning machine, Microtruder™ RCP-0250) which was adapted to the PPTA process in order to survive the contact with sulfuric acid.

The RandCastle spinning machine consists of the following parts:
 i) Hopper
 ii) Extruder (diameter=6 mm and length=240 mm; only 150 mm was used to transport and melt the spinning solution).
 iii) Four heating units for heating the extruder screw.
 iv) Spinneret (stainless steel filters: 120; 325; 325; 120 mesh, 6 spinning holes, diameter=80 μm and L/d=0.2).

The following experiment was performed with the carbon nanotube containing spinning solution (see Table 1).

TABLE 1

| | Process settings during spinning | | | | | |
|---|---|---|---|---|---|---|
| Sample | Extrusion rate (g/min) | Extrusion rate (m/min) | Speed after DR (m/min) | Draw ratio (DR) | Extruder speed (rpm) | Filament diameter (μm) |
| 1 | 0.77 | 14.59 | 74 | 5.1 | 40 | 17.4 |

In the experiment an air-gap of 0.5 cm was maintained.

The coagulation medium (water) was refreshed with a water flow of 80 to 350 ml per minute. The water temperature was approximately 21 to 24° C.

The yarn was wound on a bobbin. Subsequently, the yarn was neutralized, washed, and dried. The following procedure was used:

The yarn wound on a bobbin was washed in water (slowly streaming water) for approximately 60 minutes.

Subsequently, hydrogen carbonate was added to the water in order to neutralize the yarn (duration was approximately 1 day) and the yarn was washed with water (duration was approximately 1 day).

The yarn was dried in air for approximately 1 night.

The following fiber properties were obtained.

| LD [dtex] | BT [mN/tex] | TS [GPa] | EAB [%] | CMA [GPa] |
|---|---|---|---|---|
| 3.2 | 1196 | 1.72 | 2.3 | 71 |

LD = linear density
BT = breaking tenacity
TS = tensile strength
EAB = elongation at break
CMA = modulus The mechanical testing of single filaments of a yarn was carried out as follows.

The filaments were conditioned at 21±1° C. and 65±2% relative humidity (ASTM D1776-98). The linear density of each filament was determined according to ASTM D1577-96 (Option C—Vibroscope) over a length of 20 mm. The tensile tests were carried out on an Instron 5543 tensile tester using Instron 2712-001 filament clamps with an Arnitel® EL-550 coating. The gage length was set to 100 mm. A pre-tension of 20 mN/tex was used. The clamp speed used was 10 mm/min. The linear density and mechanical properties are average values of ten single filaments. The mechanical properties of the filaments were determined according to ASTM D885-98.

COMPARISON EXAMPLE 4

According to the prior art method as disclosed in EP 1336673 and using a plunger spinning machine.

A liquid spinning solution (dope) was produced in a Drais mixer of 6 liter. During all dope preparation steps, nitrogen was purged into the Drais mixer. The mixing chamber of the Drais mixer is a double-walled chamber. The following procedure was used to prepare the spinning solution.

- Adding 2022 grams of sulfuric acid (99.8% by weight) to a preheated mixing chamber (wall temperature=90° C.) while purging the system with nitrogen.
- Heating the mixture to a temperature of 90° C.
- Adding 5 grams of single walled carbon nanotubes. The SWNTs were dried at 50° C. under vacuum for 8-10 hours.
- Mixing the solution (liquid sulfuric acid and the SWNTs) (mixing speed=18 rpm) for 60 minutes at a temperature of 90° C.
- Adding 494 g of PPTA (having a relative viscosity 5.1) to mixture and mixing for 3 hours at a wall temperature of 90° C.

The spinning solution was spun on a plunger spinning machine (a small scale spinning machine) which was adapted to the PPTA process in order to survive the contact with sulfuric acid. The spinning machine consists of the following parts:

i) Heated reservoir (160 ml) for spinning solution (temperature=87° C.)
ii) Injection plunger for transporting spinning solution through the spinneret.
iii) Spinneret (stainless steel filters: 120; 325; 325; 120 mesh, 10 spinning holes, diameter=85 µm and temperature=87° C.).
iv)

The following spinning experiments were performed with the carbon nanotube containing spinning solution: extrusion rate=33.6, 50.4, and 67.2 m/min.

In none of these experiments it was possible to spin filaments from the carbon nanotube containing spinning solution and clogging at the surface of the spinneret was observed.

COMPARISON EXAMPLE 5

According to the prior art method as disclosed in EP 1336673 and using a RandCastle spinning machine (a small scale spinning machine; Microtruder™ RCP-0250).

A liquid spinning solution (dope) was produced in an IKA kneader of 0.6 liter. During all dope preparation steps, nitrogen was purged into the IKA kneader. The mixing chamber of the IKA kneader is a double-walled chamber. The following procedure was used to prepare the spinning solution.

- Adding 200 grams of sulfuric acid (99.8% by weight) to a preheated mixing chamber (wall temperature=80° C.) while purging the system with nitrogen.
- Heating the mixture to a temperature of 80° C.
- Adding 0.494 grams of single walled carbon nanotubes. The SWNTs were dried at 80° C. under vacuum for 8-10 hours.
- Mixing the solution (liquid sulfuric acid and the SWNTs) (mixing speed=30 rpm) for 60 minutes at a temperature of 80° C.
- Adding 48.88 g of PPTA (having a relative viscosity 5.1) to mixture and mixing for 2.5 hour at a wall temperature of 80° C.

The spinning solution was spun on a RandCastle spinning machine (a small scale spinning machine as mentioned in Example 3) which was adapted to the PPTA process in order to survive the contact with sulfuric acid.

The liquid spinning solution was transferred from the kneader to the pre-heated hopper (87° C.) of the spinning machine. The spinning solution was heated for 2.5 hours in the hopper of the RandCastle spinning machine. The following spinning experiments were performed with the carbon nanotube containing spinning solution: screw speed=27, 40, 50, and 60 rpm.

It was not possible to spin filaments from the carbon nanotube containing spinning solution. No transportation through the extruder screw was possible.

The invention claimed is:

1. A fiber having filaments comprising a mixture of PPTA and nanotubes, wherein the fiber is a multifilament fiber comprising at least 5 filaments and the nanotubes have an aspect ratio of at least 100 and a cross-sectional diameter of 5 nm or less.

* * * * *

UNITED STATES PATENT AND TRADEMARK OFFICE
CERTIFICATE OF CORRECTION

| | | |
|---|---|---|
| PATENT NO. | : 7,758,960 B2 | Page 1 of 1 |
| APPLICATION NO. | : 12/382988 | |
| DATED | : July 20, 2010 | |
| INVENTOR(S) | : Hanneke Boerstoel et al. | |

It is certified that error appears in the above-identified patent and that said Letters Patent is hereby corrected as shown below:

Title page, in item (30), please change the foreign application priority number from "04006765" to --04006765.4--;

Column 3,
Line 26, change "than" to --that--;

Column 4,
Line 10, change "($a_1$, and $a_2$)" to --($a_1$ and $a_2$)--;

Column 4,
Line 41, add --be-- after also;

Column 9,
Line 39, delete "iv)"

Signed and Sealed this

Twenty-eighth Day of September, 2010

David J. Kappos
*Director of the United States Patent and Trademark Office*